United States Patent [19]

Ko et al.

[11] 4,058,497

[45] Nov. 15, 1977

[54] ONE PACKAGE SYSTEM COLD-SETTING COATING COMPOSITIONS

[75] Inventors: Keiun Ko, Minoo; Naomitsu Takashina, Fujisawa; Senzo Shimizu, Odawara; Masuya Ikegami, Chigasaki; Yoshinori Iwamoto, Odawara, all of Japan

[73] Assignee: Mitsubishi Gas Chemical Company, Inc., Tokyo, Japan

[21] Appl. No.: 609,516

[22] Filed: Sept. 2, 1975

[30] Foreign Application Priority Data

Sept. 10, 1974 Japan .............................. 49-104638

[51] Int. Cl.² .................. C09D 3/64; C09D 3/80; C09D 5/08
[52] U.S. Cl. ..................... 260/22 A; 260/31.2 R; 260/32.4; 260/32.6 R; 428/457; 428/458
[58] Field of Search ........... 260/22 A, 32.6 R, 31.2 R, 260/32.4

[56] References Cited

U.S. PATENT DOCUMENTS

| | | |
|---|---|---|
| 3,027,341 | 3/1962 | Boucher et al. ................ 260/22 EP |
| 3,481,892 | 12/1969 | Huang et al. .................. 260/32.6 R |
| 3,491,115 | 1/1970 | Harrier ........................... 260/32.6 R |
| 3,515,690 | 6/1970 | Hunt ............................... 260/32.6 R |
| 3,632,545 | 1/1972 | Ferraro .......................... 260/30.6 R |
| 3,632,546 | 1/1972 | Haung et al. .................. 260/31.2 R |
| 3,699,065 | 10/1972 | Clark .............................. 260/32.6 R |
| 3,699,066 | 10/1972 | Hunsucker ..................... 260/32.6 R |

*Primary Examiner*—Ronald W. Griffin
*Attorney, Agent, or Firm*—Flynn & Frishauf

[57] ABSTRACT

This invention relates to a one package system cold-setting type coating composition which comprises an acrylic copolymer having carboxyl groups in its molecule or an alkyd resin, an aluminum alkoxide complex and a keto-enol tautomeric compound, characterized by adding a specific nitrogen compound to the composition for preventing discoloration of a coated substance.

7 Claims, No Drawings

ONE PACKAGE SYSTEM COLD-SETTING COATING COMPOSITIONS

This invention relates to a one package system cold-setting type coating composition which comprises an acrylic copolymer having carboxyl groups in its molecule or an alkyd resin, an aluminum alkoxide complex, a ketoenol tautomeric compound, and a solvent, characterized by adding to the composition 0.1 - 10% by weight (on the weight of the composition) of at least one nitrogen compound selected from the group consisting of a. monoamines or hydroxymonoamines having the formula

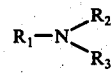  I wherein $R_1$ is alkyl having from 1 to 12 carbon atoms, alkenyl having from 2 to 12 carbon atoms, cycloalkyl or aralkyl or hydroxyalkyl having from 1 to 4 carbon atoms, and each of $R_2$ and $R_3$ is hydrogen or the same as $R_1$;

b. polyamines having the formula

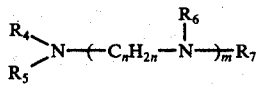  II wherein $n$ is integer of 1 - 6, $m$ is integer of 1 - 3 and each of $R_4$, $R_5$, $R_6$ and $R_7$ is hydrogen or alkyl having from 1 to 4 carbon atoms and $C_nH_{2n}$ is alkylene;

c. aromatic amino compounds having the formula

  III wherein each of $R_8$ and $R_9$ is hydrogen or alkyl having from 1 to 4 carbon atoms;

d. heterocyclic compounds selected from the group consisting of 1, 2, 4-triazole, benzotriazole, imidazole and morpholine; and e. amines selected from the group consisting of guanidine and hexamethylenetetramine.

In general, acrylic coating compositions comprise an acrylic ester or a methacrylic ester as a main component and have excellent resistance to chemicals and weather and transparency. Their adhesive property, flexibility and hardness can be unrestrictedly controlled by copolymerizing other vinylic monomers therewith. Therefore, recently the use of acrylic coating compositions has increased more and more. Particularly, acrylic coatings with a three-dimensional structure obtained by curing the acrylic ester and/or the methacrylic ester have hard and tough properties and other excellent properties.

In general, coating compositions having hard and tough properties have been made by heating an acrylic resin and an amino resin, such as a urea resin, melamine resin or benzoguanamine resin at an elevated temperature.

Also, an acrylic resin which can give rise to three-dimensional cure at a room temperature as well as at a low temperature has been used in such particular use that a substrate to be coated or an environment of the coating step can not be heated. In this case a so-called two-package system coating composition comprising an acrylic resin and a curing agent, such as an isocyanate, has generally been used. The method of carrying out cold-setting coating by using such a two-package system coating composition, however, has the following disadvantages:

a. Pot life after mixing a curing agent with a resin is short, b. Maintenance of the coating apparatus is complicated, and c. Handling of the composition is inconvenient.

In order to overcome these disadvantages, research has been made as to acrylic coating compositions which are curable at a low temperature and which, when cured, can form a film with excellent resistance to chemicals, weather and solvent.

As a result, a one package system cold-setting type acrylic coating composition having the excellent properties as mentioned above has been obtained by mixing a linear acrylic copolymer having carboxyl groups in its molecule, an aluminum alkoxide complex, a keto-enol tautomeric compound and a solvent as disclosed in U.S. Pat. No. 3,632,546 by Huang et al. In the specification and the claims, the term "aluminum alkoxide complex" means the compound obtained by reacting aluminum alkoxide with a keto-enol tautomeric compound, such as, for example an acetoacetic ester or acetylacetone, propanediol or derivative thereof or salicyclic ester.

It was known that equilibrium between an aluminum alkoxide complex and a keto-enol tautomeric compound is formed in the acrylic coating composition as mentioned above. That is, when mixing an aluminum alkoxide complex and a keto-enol tautomeric compound, the following equilibrium is formed:

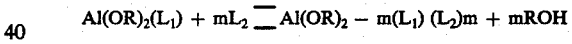

$$Al(OR)_2(L_1) + mL_2 \rightleftharpoons Al(OR)_2 - m(L_1)(L_2)m + mROH$$

wherein R is alkyl; $L_1$ is keto-enol tautomeric compound, or a compound which can form a complex with aluminum alkoxide, for example propanediol or derivative thereof, or a salicyloyl derivative, such as salicylic ester or salicyl aldehyde; $L_2$ is keto-enol tautomeric compound; $m$ is integer of 1 or 2. The coating composition is stable in the presence of the keto-enol tautomeric compound and the solvent, because the above equilibrium is maintained. However, when the coating composition is coated on the substrate, the keto-enol tautomeric compound and the solvent evaporate, whereby the composition gives rise to three-dimensional cure to form a hard and tough film having excellent properties.

Alkyd resin coating compositions comprise a polycondensate of a polyhydric alcohol and a polybasic acid as a main component. The properties and performances of the alkyd resin coating compositions can be varied widely by selecting the kinds of each of the polyhydric alcohol and polybasic acid or by adding a modifier, such as a fatty acid to the alkyd resin. In addition, the alkyd resin is low-priced. Therefore, recently a large amount of the alkyd resin has been used. Alkyd resins are classified into two large groups, thermo-setting type alkyd resin and cold-setting type alkyd resin. The former is classified into two groups according to the method for crosslinking, that is, into the method for heat-curing the alkyd resin through oxidation polymerization of the unsaturated fatty acid groups in the alkyd resin and the method for heat-curing the alkyd resin which comprises adding a urea resin or a melamine resin to the alkyd resin and allowing the crosslinking between the alkyd resin and the additive to occur. While the cold-setting type alkyd resin is cured by adding a large amount of drying oil, semi-drying oil or unsaturated fatty acid therefrom to the alkyd resin, followed by curing the mixture in the presence of a catalyst, such as compound of cobalt, manganese or lead at a room temperature. However, discoloration of coating film can not be avoided in the coating composition containing the cold-setting type alkyd resin, because a large amount of drying oil, semi-drying oil or unsaturated fatty acids therefrom and a large amount of the metallic catalyst are present in the coating composition.

In order to avoid discoloration of the coating film caused by addition of a large amount of drying oil, semi-drying oil or unsaturated fatty acids and a large amount of the metallic catalyst, a one-package system cold setting type coating composition may be prepared by incorporating the aluminum alkoxide compound and the keto-enol tautomeric compound as disclosed in U.S. Pat. No. 3,632,546 with the alkyd resin having a suitable acid value without using a large amount of drying oil, semi-drying oil or unsaturated fatty acids and a large amount of the metallic catalyst.

Nevertheless, when a one-package system cold-setting type acrylic coating composition or a one-package system cold-setting type alkyd resin coating composition containing the crosslinking agent as disclosed in U.S. Pat. No. 3,632,546 was coated on steel, particularly polished steel, it was found that discoloration of the coating film may occur. The undesirable discoloration of the coating film does not always occur. Whether or not the discoloration occurs depends on conditions under which the composition is coated, that is, the temperature and the humidity of coating environment, and the kinds of solvent employed. The higher the temperature or the humidity of the coating environment, the more striking the extent to which such discoloration occurs. Similarly, the thicker the coating of film is on the steel, the more striking the discoloration. Such discoloration occurs during the initial period of the coating step of the composition and the drying step.

In the specification, the term "discoloration of coating film" or "discoloration of coated substance" means the fact that undesirable color develops in the film or substance.

Research has been made to avoid the discoloration of the one-package system cold-setting type coating composition on the substrate, namely steel. As a result, we have found that occurrence of the discoloration can be prevented by adding at least one nitrogen compound selected from the group consisting of the following (a) – (e) to the composition comprising an acrylic copolymer or alkyd resin, an aluminum alkoxide complex, a keto-enol tautomeric compound and a solvent.

An object of the present invention is to provide an acrylic coating composition or an alkyd resin coating composition which is coated on a steel surface without discoloration.

Another object of the present invention is to provide one-package system cold-setting type coating composition having excellent mechanical and chemical properties which is coated on the substrate without discoloration.

It is assumed that the reason discoloration is prevented by adding said nitrogen compound to the composition is as follows:

As mentioned above, occurrence of the discoloration is assumed to be due to the formation of chelate between the keto-enol tautomeric compound and iron of the substrate. The nitrogen compound added covers the surface of metal which is the substrate before the keto-enol tautomeric compound reacts with the metallic substrate to form the chelate, whereby the formation of chelate which causes the discoloration is prevented. The keto-enol tautomeric compound contributes to the stability of viscosity of clear varnish. The nitrogen compound further enhances the stability.

Also, addition of the nitrogen compound to the coating composition in the present invention helps to prevent the discoloration and to improve the performances of the coating film. When the amount of the nitrogen compound added is too small, the compound can not sufficiently prevent the discoloration of the coating film or coated substance. Therefore, in this case the expected effects can not be achieved. Though addition of a large amount of the nitrogen compound to the coating composition can sufficiently prevent the discoloration, too much of the nitrogen compound impairs the performances of the coating film, such as, weather resistance of the film.

In addition, too much of the nitrogen compound impairs the crosslinking reaction. The reason is assumed to be that the reactivity of the aluminum alkoxide complex is partially lowered by the action of the nitrogen compound. Therefore, 0.1 – 10% by weight, preferably 0.5 – 5.0% by weight of the nitrogen compound is added to the coating composition comprising the acrylic copolymer or the alkyd resin, the aluminum alkoxide complex, the keto-enol tautomeric compound and the solvent based on the weight of the composition. The nitrogen compound may be added to the composition before the coating step. Alternatively, the nitrogen compound may be added to the composition beforehand.

The nitrogen compound employed in the present invention includes a. monoamines or hydroxymonoamines having the formula

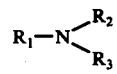    I wherein $R_1$ is alkyl having from 1 to 12 carbon atoms, alkenyl having from 2 to 12 carbon atoms, cycloalkyl, aralkyl or hydroxyalkyl having from 1 to 4 carbon atoms and each of $R_2$ and $R_3$ is hydrogen or the same as $R_1$;

b. polyamines having the formula

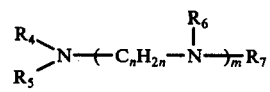    II wherein n is integer of 1 – 6, $m$ is integer of 1 – 3, and each of $R_4$, $R_5$, $R_6$ and $R_7$ is hydrogen or alkyl having from 1 to 4 carbon atoms, and $C_nH_{2n}$ is alkylene;

c. aromatic amino compounds having the formula

wherein each of $R_8$ and $R_9$ is hydrogen or alkyl having from 1 to 4 carbon atoms;

d. heterocyclic compounds selected from the group consisting of 1, 2, 4 - triazole, benzotriazole, imidazole and morpholine; and e. amines selected from the group consisting of guanidine and hexamethylenetetramine.

The preferred nitrogen compound is selected from the group consisting of a. monoamines or hydroxymonoamines having the formula

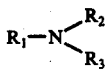

wherein $R_1$, $R_2$ and $R_3$ are as defined above;

b. polyamines having the formula

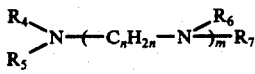

wherein $R_4$, $R_5$, $R_6$ and $R_7$ are as defined above;

c. o-aminobenzoic acid or m-dimethylaminobenzoic acid;

d. 1,2,4-triazole or imidazole; and e. guanidine.

The more preferred nitrogen compound is selected from the group consisting of a. monoamines or hydroxymonoamines having the formula

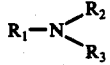

wherein $R_1$ is alkyl having from 1 to 4 carbon atoms, alkenyl having from 2 to 4 carbon atoms, hydroxyalkyl having from 1 to 4 carbon atoms, and each of $R_2$ and $R_3$ is hydrogen or the same as $R_1$;

b. polyamines having the formula

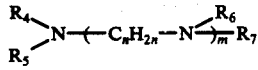

wherein $n$ is integer of 1 - 4, $m$ is integer of 1 - 2 and each of $R_4$, $R_5$, $R_6$ and $R_7$ is hydrogen or alkyl having from 1 to 4 carbon atoms and $C_nH_{2n}$ is alkylene.

The most preferred nitrogen compound is selected from monoamines or hydroxymonoamines having the formula

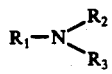

wherein $R_1$ is alkyl or hydroxyalkyl having from 1 to 4 carbon atoms and each of $R_2$ and $R_3$ is hydrogen or the same as $R_1$. When the volatility of the nitrogen compounds is poor, the nitrogen compound does not perfectly volatilize from the coated substrate even a long time after coating. The nitrogen compound left on the substrate lowers the performances of the coating film, for example water resistance of the film. Therefore, the nitrogen compounds, the volatility of which is high are preferred.

The compounds represented by the above formula I include, for example, trimethylamine, monoethylamine, diethylamine, triethylamine, n-propylamine, iso-propylamine, di-n-propylamine, di-iso-propylamine, tri-n-propylamine, n-butylamine, di-n-butylamine, tri-n-butylamine, iso-butylamine, di-iso-butylamine, tri-iso-butylamine, tert-butylamine, sec-butylamine, n-amylamine, di-n-amylamine, tri-n-amylamine, iso-amylamine, di-iso-amylamine, tri-iso-amylamine, n-hexylamine, 2-ethylhexylamine, n-dodecylamine, tri-n-octylamine, N,N-diethylhexylamine, triallylamine, cyclohexylamine, benzylamine, tribenzylamine, N,N-dimethylbenzylamine, ethanolamine, diethanolamine, triethanolamine, iso-propanolamine, di-iso-propanolamine and tri-iso-propanolamine.

The compounds represented by the above formula II, include, for example, ethylenediamine, N,N-dimethylethylenediamine, N,N'-dimethylethylenediamine, tetramethylethylenediamine, N,N-dimethyl-1, 3-propylenediamine, N,N-dimethyl-1, 2-propylene diamine, tetramethylenediamine, hexamethylenediamine, diethylenetriamine, dipropylenetriamine and triethylenetetramine.

The compounds represented by the above formula III include, for example, o-aminobenzoic acid, and m-dimethylaminobenzoic acid.

In the specification and the claims, the term "acrylic copolymer having carboxyl groups in its molecule" means a copolymer of ethylenic monomers, diene monomers or mixture thereof and at least one unsaturated carboxylic acid as disclosed in U.S. Pat. No. 3,632,546. Typical examples of ethylenic monomers and diene monomers include ethylene, propylene, butadiene, isoprene, chloroprene, styrene, α-methylstyrene, dimethylstyrene, vinyltoluene, vinyl acetate, vinyl propionate, vinyl ether, vinyl chloride, vinylidene chloride, methylacrylate, ethylacrylate, n-butylacrylate, iso-butylacrylate, 2-ethylhexylacrylate, laurylacrylate, methylmethacrylate, ethylmethacylate, n-butyl-methacrylate, iso-butylmethacrylate, 2-ethylhexylmethacrylate, and laurylmethacrylate. Typical examples of the unsaturated carboxylic acids include acrylic acid, methacrylic acid, crotonic acid, itaconic acid and maleic anhydride.

In the specification and the claims, the term "alkyd resin" means a resin having an acid value of at least 30 which comprises a polycondensate of a polyhydric alcohol and a polybasic acid. If necessary, the alkyd resin may contain modifiers, such as oil, fat or fatty acids therefrom, or other monobasic acids. Typical examples of polyhydric alcohols include ethylene glycol, propylene glycol, diethylene glycol, dipropylene glycol, butanediol, glycerol, trimethylolethane, pentanediol, neopentyl glycol, hexanediol, trimethylolpropane, pentaerythritol, diglycerol, and sorbitol. Typical examples of polybasic acids include malonic acid, succinic acid, glutaric acid, adipic acid, azelaic acid, sebacic acid, maleic acid, fumaric acid, phthalic acid, tetrahydrophthalic acid, hexahydrophthalic acid, iso-phthalic acid, terephthalic acid, trimellitic acid, pyromellitic acid, and diglycolic acid. Typical examples of oil or fat include linseed oil, soybean oil, coconut oil, tung oil, dehydrated castor oil and safflower oil. Typical examples of other monobasic acids include abietic acid and benzoic acid. In case of using a resin having an acid value of less than 30, a crosslinking reaction does not occur sufficiently, and therefore the coating film having expected film performance can not be obtained.

An acrylic copolymer having carboxyl groups in its molecule is preferred as a resin component for a one-package system cold-setting type coating composition.

Typical examples of the aluminum alkoxide complex include

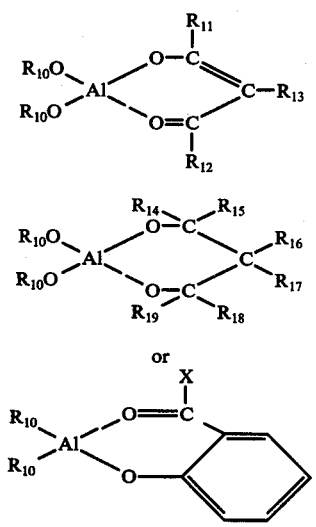

or

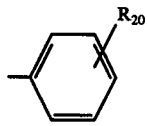

wherein $R_{10}$ represents the same or a different alkyl group having 1 to 8 carbon atoms, $R_{11}$ and $R_{12}$ mean the same or a different alkoxyl or alkyl group having 1 to 4 carbon atoms or in which $R_{20}$ indicates hydrogen or an alkyl group having 1 to 4 carbon atoms, $R_{13}$ is selected from the group conisting of hydrogen and — $COOR_{21}$ in which the $R_{21}$ is the same as above, $R_{14}$, $R_{15}$, $R_{16}$, $R_{17}$, $R_{18}$ and $R_{19}$ are each selected from the group consisting of hydrogen, an alkyl group having 1 to 4 carbon atoms and — $OR_{22}$ in which $R_{22}$ is as precedingly defined, and $R_{16}$ $R_{17}$ may be — $CH_2OH$, X is hydrogen or — $OR_{23}$ in which $R_{23}$ stands for an alkyl group having 1 to 4 carbon atoms.

Typical examples of the keto-enol tautomeric compound include methylacetoacetate, ethylacetoacetate, diethylmalonate, dibutylmalonate, acetylacetone, ethyldiacetylacetate, benzoylacetone or dibenzoylmethane.

Typical examples of the solvent include benzene, toluene, xylene, methylethyl ketone, methylisobutyl ketone, propanol, iso-propanol, n-butanol, iso-butanol, ethylacetate, n-butylacetate and 2-methoxyethanol.

As mentioned above, the coating composition of the present invention provides an excellent coating film which does not have undesired color even when it is coated under various coating conditions. The coating composition of the present ivention is usable as a clear varnish as well as enamel paint containing any pigments.

Though the coating composition of the present invention is a cold-setting type one and it is not required to heat the composition for curing, the composition may be heated for curing within a short time. Also, after it is cured at a room temperature, the resulting dry film may be heated for improving the properties of the film.

The present invention is further illustrated by the following Examples. However, this invention should not be limited by these examples, and the changes and modifications within the spirit and scope of the claims can be effected. The percent and parts in the Examples are based on the weight unless otherwise specified.

EXAMPLE 1

Into a 3000 ml three-necked flask equipped with thermometer, stirrer, condenser and dropping funnel were introduced 474 parts of toluene and 158 parts of n-butanol. The flask was purged with nitrogen. The contents were heated to reflux on an oil bath of 130° C. After reflux starts, a mixture of 382 parts of styrene, 488 parts of butyl acrylate, 95 parts of methacrylic acid and 11.3 parts of dicymyl peroxide as a polymerization initiator was added dropwise thereto over three hours, and the resulting mixture was maintained at reflux temperature for an additional 10 hours period. Thereafter the polymerization conversion reached about 100 %. Into the flask was added 322 parts of a mixed solvent consisting of 75% of toluene and 25% of n-butanol, whereby the mixture was diluted until the concentration of non-volatile material reached 50%. A colorless clear resin solution having a viscosity of $3 \times 10^3$ centipoise was obtained. To the resulting resin solution was added 140.4 parts of acetylacetone, and the resulting mixture was stirred. 570 Parts of a 30% solution of aluminum alkoxide complex produced by reacting one mole of aluminum isopropoxide with two moles of ethyl acetoacetate in isopropyl alcohol was added to the resulting mixture and was stirred to obtain a one-package system cold-setting type transparent acrylic clear varnish having viscosity of less than $10^3$ centipoise.

Additive consisting of 80 parts of isopropyl alcohol and 20 parts of triethylamine (hereinunder referred to as additive (1T)) was prepared. 1.0 Part of additive (1T) was added to 40 parts of the above clear varnish. To the resulting mixture was added a mixed solvent of 75% of toluene and 25% of n-butanol (referred to as Mixed Solvent (S)). The resulting mixture (referred to as Composition (N1)) is the coating composition of the present invention. Composition (N1) was coated in such an amount that the thickness of the coating film after coating and drying amounted to 20 - 30 $\mu$ on a piece of cold-rolled steel plate (50 $\times$ 150 $\times$ 0.8 mm) polished by sand paper No. 300. The coated steel was placed in a thermo-hydrostat in which the relative humidity (RH) was maintained at 90% RH and the temperature was maintained at 30° C and was kept therein for 30 minutes.

For comparison, the above procedure was repeated except that the clear varnish not containing Additive (1T) was used in place of Composition (N1). The samples coated by the present composition and the control composition were observed. The surface of sample coated by the control composition turned brown, whereas only a portion of the surface of sample coated by the present composition turned light in color.

Experiments were performed under the following conditions for determining the relation between temperature and humidity and the degree of discoloration of the surface of steel obtained by coating composition (N1). Composition (N1) was coated on each piece of cold rolled steel plate polished by sand paper No. 300. Each of the samples was maintained under the following conditions for 30 minutes. The degree of discoloration was judged by five degree discoloration scale.

The results are shown in Table 1.
a. 40° C — 70%, 80%, 90% RH
b. 30° C — 70%, 80%, 90% RH

EXAMPLE 2

To 40 parts of acrylic clear varnish prepared in Example 1 was added 10.0 parts of Additive (1T) prepared in Example 1. The viscosity of the resulting mixture was adjusted by adding Mixed Solvent (S) prepared in Example 1, thereby forming the mixture (referred to as Composition (N2)). Composition (N2) was coated on the cold-rolled steel plate by the same way as Example 1. Discoloration as not detected in the film.

The same experiments as in Example 1 were performed for determining the relation between temperature and humidity and the degree of discolaration of the surface of steel on which Composition (N2) is coated. The results are shown in Table 1.

Composition (N2) was coated on the release agent-coated polyester film so that the thickness of the dry film after coating and drying amounted to about 20 – 30 μ. The resulting polyester film was placed in an air-conditioned room, and was maintained at a temperature of 20° C and at a humidity of 65% RH for a specific period. Thereafter, portion (about 1 gr.) of the dry film of Composition (N2) was removed from the polyester film. The dry film of Composition (N₂) was slit, and the slit dry film was wrapped in wire gauze of 200 mesh made of stainless steel. The dry film of Composition (N2) wrapped by the wire gauze was immersed in boiling acetone for 6 hours, whereby the acetone-soluble material contained in the film was extracted in the acetone. The non-extracted material was dried at a temperature of 100° C for 2 hours. The dried non-extracted material was weighed. The gel percent of film of Composition (N2) was calculated by the following equation. For comparison the above procedure was repeated by using clear varnish not containing Additive (1T). As a result of the test, it was found that the crosslinking reactivity of the acrylic resin does not lower to the remarkable extent to which the performances of film lowers. In addition, the gel percent of the dry film made from the acrylic resin containing the nitrogen compound is approximately the same as that of the dry film made from the acrylic resin not containing the nitrogen compound $$\text{Gel percent} = \frac{\text{weight of the film after extraction}}{\text{weight of the film before extraction}} \times 100(\%)$$

EXAMPLE 3

Additive (3T) was prepared by adding 20 parts of 1,2,4-triazole to 80 parts of isopropyl alcohol. Composition (N3) was prepared by mixing 40 parts of acrylic clear varnish prepared in Example 1 and 20.0 parts of Additive (3T), followed by adding Mixed Solvent (S) prepared in Example 1 thereto for adjusting the viscosity of the Composition.

The same experiments as Example 1 were performed for determining the relation between temperature and humidity upon the degree of discoloration of the film on which Composition (N3) is coated. The results are shown in Table 1.

EXAMPLE 4

Additive (4T) was prepared by adding 10 parts of quanidine to 40 parts of isopropylalcohol. Composition (N4) was prepared by adding 0.5 parts of Additive (4T) to 40 parts of acrylic clear varnish prepared in Example 1, followed by adding Mixed Solvent (S) prepared in Example 1 thereto for adjusting the viscosity of the Composition.

As in Example 1, composition (N4) was coated on cold-rolled steel plate as employed in Example 1. The resulting coated steel plate was placed in a thermohydrostat maintained at a temperature of 30° C and at a humidity of 70% RH, and the steel was kept therein for 30 minutes. A portion of the film only turned light in color, whereas almost all the film of clear varnish not containing the nitrogen compound changed to brown.

EXAMPLE 5

Composition (N5) was prepared by adding 10.0 parts of Additive (4T) prepared in Example 4 to 40.0 parts of acrylic clear varnish prepared in Example 1.

After Composition (N5) was coated on the surface of the same type of cold-rolled steel plate as in Example 1, the coated steel plate was placed in a thermo-hydrostat maintained at 40° C and at 80% RH and was kept therein for 30 minutes. Discoloration of the film was not detectable.

EXAMPLE 6

Into a 3000 ml four-necked flask equipped with stirrer, partial condenser, nitrogen-introducing glass tube and temperature-controlling thermocouple were introduced 528.00 parts of neopentyl glycol and 259.15 parts of isophthalic acid. The contents were melted by heating, and thereafter, the oxygen in the flask was purged with nitrogen (50 – 100 ml/minute) with stirring. While maintaining the temperature at 200° C, the reaction was allowed to proceed. When about 28 parts of water were formed, the temperature lowered to 180° C. To the mixture was added 299.69 parts of trimellitic anhydride and the reaction was allowed to proceed for 1.5 hours at 180° C to obtain an alkyd resin having an acid value of 80 and molecular weight of 550. 150 parts of the resulting resin was diluted with 75 parts of a mixed solvent of 75% of toluene and 25% of n-butanol. To the resin solution was added 26.98 parts of acetylacetone with stirring. To the resulting resin solution was added 110.46 parts of a 30% solution of aluminum alkoxide complex produced by reacting one mole of aluminum isopropoxide with two moles of ethyl acetoacetate in isopropyl alcohol to form a one-package system cold-setting type alkyd clear varnish. Additive (6T) was prepared by adding 20 parts of tri-n-butylamine to 80 parts of isopropyl alcohol. Composition (N6) was prepared by adding 1.0 part of Additive (6T) to 40 parts of the above clear varnish, followed by adding Mixed Solvent (S) prepared in Example 1 thereto for adjusting the viscosity of the composition. As in Example 1, Composition (N6) was coated on the steel plate, and the coated steel plate was maintained at a temperature of 30° C and a humidity of 90% RH for 30 minutes. Slight discoloration of the film was detected.

EXAMPLE 7

Composition (N7) was prepared by adding 3.0 parts of Additive (6T) prepared in Example 6 to 40 parts of alkyd clear varnish prepared in Example 6, followed by adding Mixed Solvent (S) prepared in Example 1 thereto for adjusting the viscosity of the Composition. In accordance with the procedure of Example 1, Composition (N7) was coated on the steel plates, and the coated steel plates were kept under the specific conditions as described in Table 1. The results are shown in Table 1.

As in Example 2, Composition (N7) was coated on a polyester film. The coated polyester film was maintained at a temperature of 20° C and a humidity of 65% RH in an air conditioned room. Portion (about 1 gr) of the dry film was removed from the polyester film, after the lapse of every predetermined period. Each sample of the dry film was slit. Each of the slit samples was wrapped by wire gauze of 200 mesh made of stainless steel. The wrapped samples were extracted in acetone for 6 hours, whereby the acetone-soluble material contained in the film was extracted in the acetone. The non-extracted material was dried at a temperature of 100° C for 2 hours. The dried material was weighed. The gel percent of film of Composition (N7) was calculated by the equation given in Example 2. For comparison, the above procedure was repeated by using clear varnish not containing the nitrogen compound. The results are shown in Table 2. From the results, the cross-linking reactivity of the alkyd resin hardly lowered. Therefore, it was found the nitrogen compound did not impair the performance of the dry film.

EXAMPLE 8

Additive (8T) was prepared by adding 10 parts of o-aminobenzoic acid to 40 parts of isopropyl alcohol. Composition (N8) was prepared by adding 6.0 parts of Additive (8T) to 40 parts of alkyd clear varnish prepared in Example 6, followed by adding Mixed Solvent (S) prepared in Example 1 thereto for adjusting the viscosity of the Composition. As in Example 1, Composition (N8) was coated on the same type of steel plate as Example 1, and the coated steel plate was maintained at 30° C and 90% RH in a thermo-hydrostat for 30 minutes. Discoloration of the film was not detectable.

EXAMPLE 9

Into a 3000 ml four-necked flask equipped with thermometer, stirrer, condenser and dropping funnel were introduced 617 parts of toluene and 206 parts of n-butanol. The flask was purged with nitrogen gas. The mixture was refluxed by heating it at temperature of 130° C. While refluxing, a mixture consisting of 382 parts of methyl methacrylate, 488 parts of butyl acrylate, 95 parts of methacrylic acid and 8.29 parts of tert-butylperoxy propyl carbonate as a polymerization initiator was added dropwise to the flask over 3 hours, and after the addition was completed the resulting mixture was refluxed for an additional 5 hours. Thereafter the polymerization conversion reached about 100%. Then to the resulting mixture were added 134 parts of mixed solvent consisting of 75% of toluene and 25% of n-butanol, whereby the resin solution was diluted so that the content of non-volatile material amounted to about 50%. As a result, a colorless, clear acrylic resin solution having a viscosity of $3 \times 10^3$ centipoise was obtained. With the resulting resin solution was mixed 139 parts of acetylacetone. Then 570 parts of a 30% solution of aluminum alkoxide complex produced by reacting one mole of aluminum isopropoxide with two moles of ethyl acetoacetate in isopropyl alcohol was added to the resin solution with stirring to form a one-package system cold-setting type acrylic clear varnish having a viscosity of less than $10^3$ centipoise. Additive (9T) was prepared by adding 20 parts of N,N'-dimethyl-ethylene diamine to 80 parts of isopropyl alcohol. Composition (N9) was prepared by adding 1.0 part of Additive (9T) to 40 parts of clear varnish above, followed by adding Mixed Solvent (S) prepared in Example 1 thereto for adjusting the viscosity of the Composition.

As in Example 1, Composition (N9) was coated on the same type of steel plate as Example 1, and the coated steel plate was maintained at 30° C and 90% RH in a thermo-hydrostat for 30 minutes. Almost no discoloration of the film was detectable.

EXAMPLE 10

Composition (N10) was prepared by adding 2.0 parts of Additive (9T) prepared in Example 9 to 40 parts of acrylic clear varnish prepared in Example 9, followed by adding Mixed Solvent (S) as Example 1 thereto for adjusting the viscosity of the Composition.

As in Example 1, Composition (N10) was coated on the same type of steel plates as Example 1, and the coated steels plates were kept in a thermo-hydrostat at the temperatures and humidities given in Table 1, whereby the relation between temperature and humidity and the degree of discoloration of the film on which Composition (N10) was coated was determined. The results are shown in Table 1.

EXAMPLE 11

Additive (11T) was prepared by adding 20 parts of diethanolamine to 80 parts of methylalcohol. Composition (N11) was prepared by adding 20 parts of Additive (11T) to 40 parts of acrylic clear varnish prepared in Example 9.

The same experiments as in Example 1 were performed for determining the relation between temperature and humidity and the degree of discoloration of the film on which Composition (N11) was coated. The results are shown in Table 1.

EXAMPLE 12

Into a 3000 ml four necked flask equipped with stirrer, partial condenser, nitrogen-introducing glass tube and temperature-controlling thermocouple were introduced 545.12 parts of neopentyl glycol and 235.37 parts of adipic acid. The contents were melted by heating, and then the flask was purged with nitrogen (50 – 100 ml/minute) with stirring. While maintaining the temperature of the inner part of flask at 200° C, the reaction was allowed to proceed. When about 29 parts of water was formed, the temperature lowered to 180° C. To the mixture was added 309.40 parts of trimellitic anhydride, and the reaction was allowed to proceed for 1.5 hours at 180° C to obtain alkyd resin having an acid value of 80 and molecular weight of 547. 100 parts of the resin was diluted with 35 parts mixed solvent consisting of 75% of toluene and 25% of n-butanol, and then 17.98 parts of acetylacetone was added thereto with stirring, and to the resulting resin solution was added 73.64 parts of a 30% solution of aluminum alkoxide complex produced by reacting one mole of aluminum isopropoxide with two moles of ethylacetoacetate in isopropyl alcohol to form a one-package system cold-setting type alkyd clear varnish.

Additive (12T) was prepared by adding 20 parts of diethylene triamine to 80 parts of ethyl alcohol. Composition (N12) was prepared by adding 4.0 parts of Additive (12T) to 40 parts of the above clear varnish, followed by adding Mixed Solvent (S) prepared in Example 1 thereto for adjusting the viscosity of the Composition.

The same experiments as Example 1 were performed for determining the relation between temperature and humidity and the degree of discoloration of the film on which Composition (N12) was coated. The results are s shown in Table 1.

EXAMPLE 13

Additive (13T) was prepared by adding 20 parts of benzotriazole to 80 parts of toluene. Composition (N13) was prepared by adding 15.0 parts of Additive to 40 parts of alkyd clear varnish prepared in Example 12.

The same experiments as in Example 1 were performed for determining the relation between temperature and humidity and the degree of discoloration of the film on which Composition (N13) was coated. The results are shown in Table 1.

EXAMPLE 14

Additive (14 T) was prepared by adding 20 parts of n-hexylamine to 80 parts of isopropyl alcohol. Composition (N 14) was prepared by adding 5.0 parts of Additive (14 T) to 40 parts of acrylic clear varnish prepared in Example 1, followed by adding Mixed Solvent (S) prepared in Example 1 thereto for adjusting the viscosity of the composition. As in Example 1, Composition (N 14) was coated on the same type of steel plates as in Example 1, and the coated steel plates were kept in a thermo-hydrostat under temperatures and humidities given in Table 1, whereby the relation between temperature and humidity and the degree of discoloration of the film on which Composition (N 14) was coated was determined. The results are shown in Table 1.

EXAMPLE 15

Additive (15 T) was prepared by adding 20 parts of dipropylenetriamine to 80 parts of isopropyl alcohol. Composition (N 15) was prepared by adding 2.0 parts of Additive (15 T) to 40 parts of acrylic clear varnish prepared in Example 1, followed by adding Mixed Solvent (S) prepared in Example 1 thereto for adjusting the viscosity of the composition. As in Example 1, Composition (N 15) was coated on the same type of steel plates as in Example 1, and the coated steel plates were kept in a thermo-hydrostat at 50° C and 90% RH for 30 minutes. No discoloration of the film was detectable.

EXAMPLE 16

Additive (16 T) was prepared by adding 20 parts of imidazole to 80 parts of isopropyl alcohol. Composition (N 16) was prepared by adding 5.0 parts of Additive (16 T) to 40 parts of acrylic clear varnish prepared in Example 9, followed by adding Mixed Solvent (S) prepared in Example 1 thereto for adjusting the viscosity of the composition. As in Example 1, Composition (N 16) was coated on the same type of steel plates as in Example 1, and the coated steel plates were kept in a thermo-hydrostat at 40° C and 70% RH for 30 minutes. No discoloration of the film was detectable.

EXAMPLE 17

Additive (17 T) was prepared by adding 20 parts of cyclo-hexylamine to 80 parts of isopropyl alcohol. Composition (N 17) was prepared by adding 3.0 parts of Additive (17 T) to 40 parts of acrylic clear varnish prepared in Example 9, followed by adding Mixed Solvent (S) prepared in Example 1 thereto for adjusting the viscosity of the composition. As in Example 1, Composition (N 17) was coated on the same type of steel plates as in Example 1, and the coated steel plates were kept in a thermo-hydrostat under temperatures and humidities given in Table 1, whereby the relation between temperature and humidity and the degree of discoloration of the film on which Composition (N 17) was coated was determined. The results are shown in Table 1.

EXAMPLE 18

Composition (N 18) was prepared by adding 5.0 parts of Additive (17 T) prepared in Example 17 to 40 parts of acrylic clear varnish prepared in Example 1, followed by adding Mixed Solvent (S) prepared in Example 1 thereto for adjusting the viscosity of the composition. As in Example 1, Composition (N 18) was coated on the same type of steel plates as in Example 1, and the coated steel plates were kept in a thermo-hydrostat at 50° C and 90% RH for 30 minutes. No discoloration of the film was detectable.

EXAMPLE 19

Additive (19 T) was prepared by adding 20 parts of 2-ethylhexylamine to 80 parts of isopropyl alcohol. Composition (N 19) was prepared by adding 3.0 parts of Additive (19 T) to 40 parts of alkyd clear varnish prepared in Example 6, followed by adding Mixed Solvent (S) prepared in Example 1 thereto for adjusting the viscosity of the composition. As in Example 1, Composition (N 19) was coated on the same type of steel plates as in Example 1, and the coated steel plates were kept in a thermo-hydrostat at 40° C and 90% RH for 30 minutes. No discoloration of the film was detectable.

EXAMPLE 20

Additive (20 T) was prepared by adding 20 parts of hexamethylene diamine to 80 parts of isopropyl alcohol. Composition (N 20) was prepared by adding 2.0 parts of Additive (20 T) to 40 parts of alkyd clear varnish prepared in Example 6, followed by adding Mixed Solvent (S) prepared in Example 1 thereto for adjusting the viscosity of the composition. As in Example 1, Composition (N 20) was coated on the same type of steel plates as in Example 1, and the coated steel plates were kept in a thermo-hydrostat under temperatures and humidities given in Table 1, whereby the relation between temperature and humidity and the degree of discoloration of the film on which Composition (N 20) was coated was determined. The results are shown in Table 1.

EXAMPLE 21

Additive (21 T) was prepared by adding 20 parts of di-isopropylamine to 80 parts of isopropyl alcohol. Composition (N 21) was prepared by adding 2.0 parts of Additive (21 T) to 40 parts of alkyd clear varnish prepared in Example 12, followed by adding Mixed Solvent (S) prepared in Example 1 thereto for adjusting the viscosity of the composition. As in Example 1, Composition (N 21) was coated on the same type of steel plates as in Example 1, and the coated steel plates were kept in a thermo-hydrostat at 40° C and 90% RH for 30 minutes. No discoloration of the film was detectable.

EXAMPLE 22

Additive (22 T) was prepared by adding 20 parts of di-isopropanolamine to 80 parts of methyl alcohol. Composition (N 22) was prepared by adding 5.0 parts of Additive (22 T) to 40 parts of alkyd clear varnish prepared in Example 12, followed by adding Mixed Solvent (S) prepared in Example 1 thereto for adjusting the viscosity of the composition. As in Example 1, Composition (N 22) was coated on the same type of steel plates as in Example 1, and the coated steel plates were kept in a thermo-hydrostat at 50° C and 90% RH for 30 minutes. No discoloration of the film was detectable.

Table 1

| Temperature | | 40° C | | | 50° C | | |
|---|---|---|---|---|---|---|---|
| Humidity | | 70% RH | 80% RH | 90% RH | 70% RH | 80% RH | 90% RH |
| | N 1 | 4 – 5 | 4 | 3 – 4 | 4 | 3 – 4 | 2 |
| | N 2 | 5 | 5 | 5 | 5 | 5 | 5 |
| | N 3 | 5 | 5 | 5 | 5 | 5 | 5 |
| | N 7 | 5 | 5 | 5 | 5 | 4 | 3 – 4 |
| Composition No. | N10 | 5 | 5 | 4 – 5 | 5 | 4 – 5 | 4 – 5 |
| | N11 | 5 | 5 | 5 | 5 | 5 | 5 |
| | N12 | 5 | 5 | 5 | 5 | 5 | 4 – 5 |
| | N13 | 5 | 5 | 5 | 5 | 5 | 5 |
| | N14 | 5 | 5 | 5 | 5 | 5 | 5 |
| | N17 | 5 | 4 – 5 | 4 | 4 – 5 | 4 | 4 |
| | N21 | 5 | 5 | 4 – 5 | 5 | 4 – 5 | 4 |

Discoloration Scale
5 no discoloration
4 partial discoloration
3 mottled discoloration
2 overall faint discoloration
1 significant discoloration Table 2

| | Gel percent | | | |
|---|---|---|---|---|
| | after 1 day | after 2 days | after 3 days | after 7 days |
| dry film not containing the nitrogen compound | 63 | 65 | 70 | 73 |
| dry file containing Composition (N 7) | 57 | 65 | 71 | 71 |

What we claim is:

1. A one-package system cold-setting coating composition which consists essentially of (i) an acrylic copolymer having carboxyl groups in its molecule or an alkyd resin as a resin component, (ii) an aluminum alkoxide complex, (iii) a keto-enol tautomeric compound and (iv) a solvent, and (v) from 0.01 to 10 percent by weight of at least one nitrogen compound based on the weight of the composition comprising (i), (ii), (iii) and (iv), said nitrogen compound being selected from the group consisting of a. a monoamine or a hydroxymonoamine having the formula

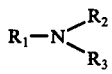
           I wherein $R_1$ is alkyl having from 1 to 12 carbon atoms, alkenyl having from 2 to 12 carbon atoms, cyclohexyl, benzyl or hydroxyalkyl having from 1 to 4 carbon atoms, and each of $R_2$ and $R_3$ is hydrogen or the same as $R_1$;

b. a polyamine having the formula

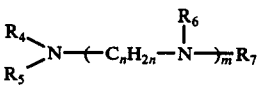
           II wherein $n$ is an integer of 1 – 6, $m$ is an integer of 1 – 3 and each of $R_4$, $R_5$, $R_6$ and $R_7$ is hydrogen or alkyl having from 1 to 4 carbon atoms, and $C_nH_{2n}$ is alkylene;

c. an aromatic amino compound having the formula

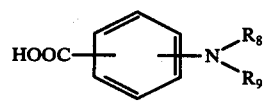
           III wherein each of $R_8$ and $R_9$ is hydrogen or alkyl having from 1 to 4 carbon atoms;

d. a heterocyclic compound selected from the group consisting of 1,2,4-triazole, benzotriazole, imidazole and morpholine; and e. an amine selected from the group consisting of guanidine and hexamethylenetetramine.

2. The coating composition claimed in claim 1, wherein the nitrogen compound is selected from the group consisting of a. a monoamine or a hydroxymonoamine having the formula

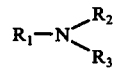
           I wherein $R_1$, $R_2$ and $R_3$ are as defined in claim 1;

b. a polyamine having the formula

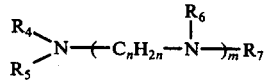
           II wherein $R_4$, $R_5$, $R_6$ and $R_7$ are as defined in claim 1;

c. o-aminobenzoic acid or m-dimethylaminobenzoic acid;

d. 1,2,4-triazole or imidazole; and e. guanidine.

3. The coating composition claimed in claim 1, wherein the nitrogen compound is selected from the group consisting of a. a monoamine or a hydroxymonoamine having the formula

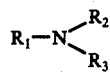   I wherein $R_1$ is alkyl having from 1 to 4 carbon atoms, alkenyl having from 2 to 4 carbon atoms, hydroxyalkyl having from 1 to 4 carbon atoms, and each of $R_2$ and $R_3$ is hydrogen or the same as $R_1$;

b. a polyamine having the formula

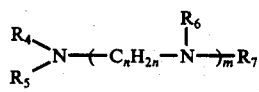   II wherein $n$ is an integer of 1 – 4, $m$ is an integer of 1 – 2 and each of $R_4$, $R_5$, $R_6$ and $R_7$ is hydrogen or alkyl having from 1 to 4 carbon atoms, and $C_nH_{2n}$ is alkylene.

4. The coating composition claimed in claim 1, wherein the nitrogen compound is monoamine having the formula

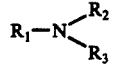   I wherein $R_1$ is alkyl having from 1 to 4 carbon atoms and each of $R_2$ and $R_3$ is hydrogen or the same as $R_1$.

5. The coating composition claimed in claim 1, wherein the nitrogen compound is a hydroxymonoamine having the formula

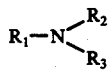   I wherein $R_1$ is hydroxyalkyl having from 1 to 4 carbon atoms and each of $R_2$ and $R_3$ is hydrogen or the same as $R_1$.

6. The coating composition claimed in claim 1, wherein the amount of the nitrogen compound is from 0.5 to 5% by weight based on the weight of the composition comprising (i), (ii), (iii) and (iv).

7. The coating composition claimed in claim 1, wherein the resin component is an acrylic copolymer having carboxyl groups in its molecule.

* * * * *

UNITED STATES PATENT AND TRADEMARK OFFICE
CERTIFICATE OF CORRECTION

PATENT NO. : 4,058,497
DATED : November 15, 1977
INVENTOR(S) : KEIUN KO et al

It is certified that error appears in the above-identified patent and that said Letters Patent are hereby corrected as shown below:

Column 2, line 40: " $=$ " should read --- $\rightleftarrows$ ---.

Column 9, line 22: replace "discolaration" with ---discoloration---.

Column 13, line 14: after "are", delete "s".

Column 7, line 51: after "$R_{16}$", insert a comma (,).

Column 7, line 68: replace "ivention" with ---invention---.

Claim 1, line 51: replace "0.01" with ---0.1---.

Signed and Sealed this

Twenty-sixth Day of September 1978

[SEAL]

Attest:

RUTH C. MASON
Attesting Officer

DONALD W. BANNER
Commissioner of Patents and Trademarks